(12) United States Patent
Derouane et al.

(10) Patent No.: US 6,437,526 B1
(45) Date of Patent: Aug. 20, 2002

(54) COMMUTATION SYSTEM FOR TORQUE RIPPLE MINIMIZATION

(75) Inventors: Benoit Derouane, Tours (FR); Sunil Keshava Murthy, Fenton, MI (US); Tomy Sebastian, Saginaw, MI (US); Buyun Liu, Ann Arbor, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/657,887

(22) Filed: Sep. 8, 2000

Related U.S. Application Data

(60) Provisional application No. 60/154,611, filed on Sep. 17, 1999.

(51) Int. Cl.[7] ................................................. H02K 29/08
(52) U.S. Cl. ..................... 318/254; 310/68 R; 310/254; 310/261
(58) Field of Search ................................. 318/138, 254, 318/439; 310/152, 156, 254, 261, 40 R, 66, 68 R

(56) References Cited

U.S. PATENT DOCUMENTS

| | | | | |
|---|---|---|---|---|
| 4,355,255 A | * | 10/1982 | Herr et al. ................... 310/254 |
| 4,494,053 A | * | 1/1985 | Gotou ......................... 318/254 |
| 4,758,768 A | * | 7/1988 | Hendricks et al. ........... 318/254 |
| 4,864,198 A | * | 9/1989 | Takase et al. ................ 318/254 |
| 4,882,524 A | * | 11/1989 | Lee .............................. 318/254 |
| 5,173,651 A | * | 12/1992 | Buckley et al. .............. 318/701 |
| 5,982,067 A | * | 11/1999 | Sebastian et al. ............ 310/184 |
| 6,104,117 A | * | 8/2000 | Nakamura et al. ........... 310/254 |

FOREIGN PATENT DOCUMENTS

WO    WO 97/25767    7/1997

OTHER PUBLICATIONS

"A Kinder, Gentler Controller Softens Torque Ripple", Machine Design, Mar. 12, 1992, pp. 83–86.

* cited by examiner

*Primary Examiner*—Bentsu Ro
(74) *Attorney, Agent, or Firm*—Edmund P. Anderson

(57) ABSTRACT

A system for reducing torque ripple in an electric motor, comprising an electric motor having a stator and a rotor, a first set of N Hall sensors, a second set of N Hall sensors, a controller, and wherein said N Hall sensors in each said set of Hall sensors is spaced 360/N electrical degrees apart and said first and second sets of Hall sensors are spaced T electrical degrees apart, and wherein said controller is adapted to provide increased current during an overlap period detected by said Hall sensors.

12 Claims, 7 Drawing Sheets

COMMUTATION SYSTEM FOR TORQUE RIPPLE MINIMIZATION

CROSS REFERENCE TO RELATED APPLICATIONS

This application is based upon, and claims the benefit of U.S. Provisional Ser. No. 60/154,611, filed on Sep. 17, 1999.

FIELD OF THE INVENTION

This invention relates to minimizing torque ripple in electric motors.

BACKGROUND OF THE INVENTION

Torque ripple in conventional permanent magnet motors is problematic in that users of devices employing such motors may find the movement of the device, associated with torque ripple, annoying. This is the case with electric assist power steering systems using permanent magnet motors. While the motors perform the intended job of reducing steering effort in a reliable manner, the operator of a vehicle having such system may be able to feel the torque ripple in some situations. Since vehicle manufacturers are constantly attempting to gain consumer interest by avoiding undesirable conditions it is well to reduce torque ripple to levels not detectable by the ordinary human operator.

BRIEF SUMMARY OF THE INVENTION

Disclosed is a system of reducing torque ripple wherein two sets of three Hall sensors are used to provide information on the position of the motor rotor. The three Hall sensors in each set are displaced 120 electrical degrees. The two sets are displaced T electrical degrees apart so as to minimize torque ripple. It is found that torque ripple can thus be reduced to 3% to 5% with no significant change in cogging torque.

DETAILED DESCRIPTION OF THE INVENTION

Figure 1:
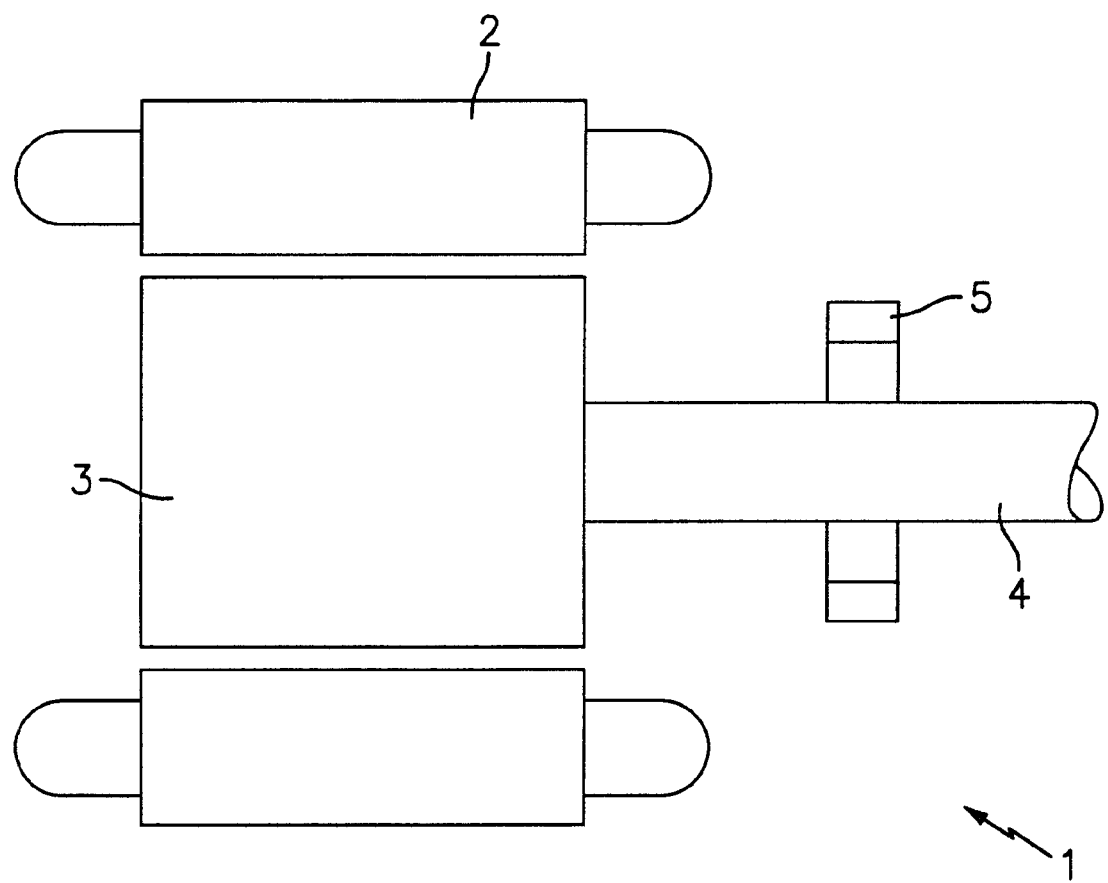
FIG. 1 depicts a side, view typical electric motor that may be used with the invention.

Referring to FIG. 1 there is depicted an electric motor 1 having a stator 2 and a rotor 3. The rotor has a shaft 4 to which is attached a "sensemagnet" 5 radially displaced away from the central axis of the shaft that rotates along with the shaft and the position of which can be detected by a Hall sensor. This is a preferred scheme for sensing to angular position of the rotor 3.

Figure 2:
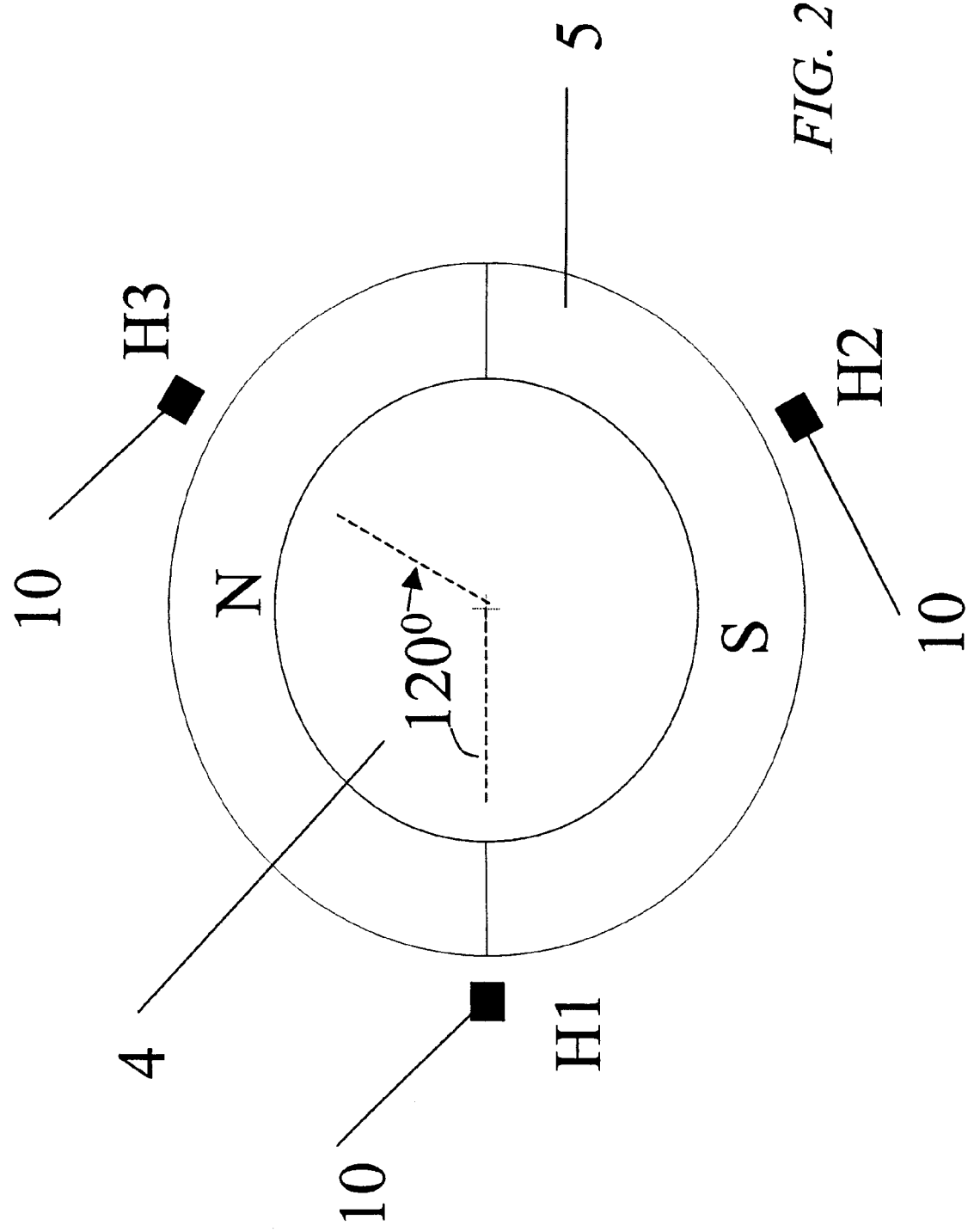
FIG. 2 depicts an axial view of a conventional 2-pole electric motor with three Hall sensors.

Other schemes of using the main magnet for sensing are also possible Referring to FIG. 2 there is shown an axial view of a typical prior art 2-pole rotor showing a two-pole sensing magnet (north and south). Equally spaced around the shaft 4 of the rotor are a first set 10 of N Hall sensors spaced an equal number of electrical degrees apart around the 360 degree circumference of the shaft, or 360/N degrees. In the drawing, N=3 for a three-phase motor. For a 2-pole machine the electrical angle and mechanical angle are equal. For a P-pole machine electrical angle is mechanical angle X P/2. The Hall sensors H1, H2, H3 sense the polarity of the sensemagnet and the information is used by a controller or inverter to switch the currents to the motor windings. In this manner, Brushless commutation is achieved.

Figure 3:
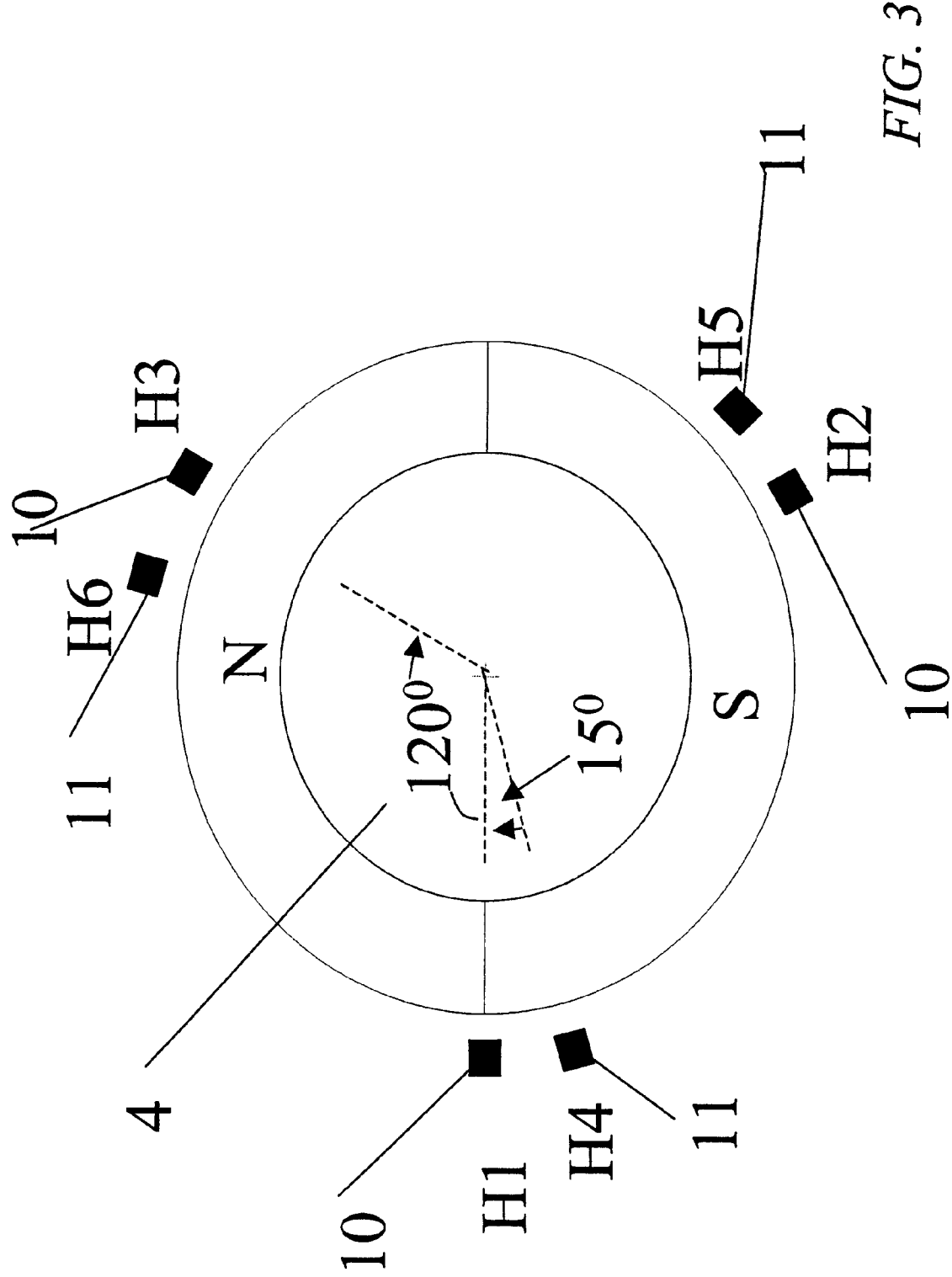
FIG. 3 depicts an axial view of a 2-pole electric motor of the invention provided with two sets of three Hall sensors.

Referring to FIG. 3 there is shown an axial view of the commutation system of the present invention. A second set 11 of Hall sensors formed by H4, H5, and H6 is provided, also spaced electrically equally around the rotor shaft 4. The two sets 10, 11 of Hall sensor are separated by an radial angle of θ electrical degrees such that the controller can now detect when the rotor has moved θ electrical degrees past each commutation event. It is at some point shortly after a commutation event occurs that the back-voltage from the windings causes a torque ripple in the motor. The controller counteracts this by applying increased current immediately upon the start of a commutation event and terminating θ electrical degrees later. The angle θ is referred to as the "overlap period" in this specification because it is the period that two or more than two windings have current running through them at the same time. For a conventional motor the optimum angle θ is 30 electrical degrees.

Figures 6A, 6B:
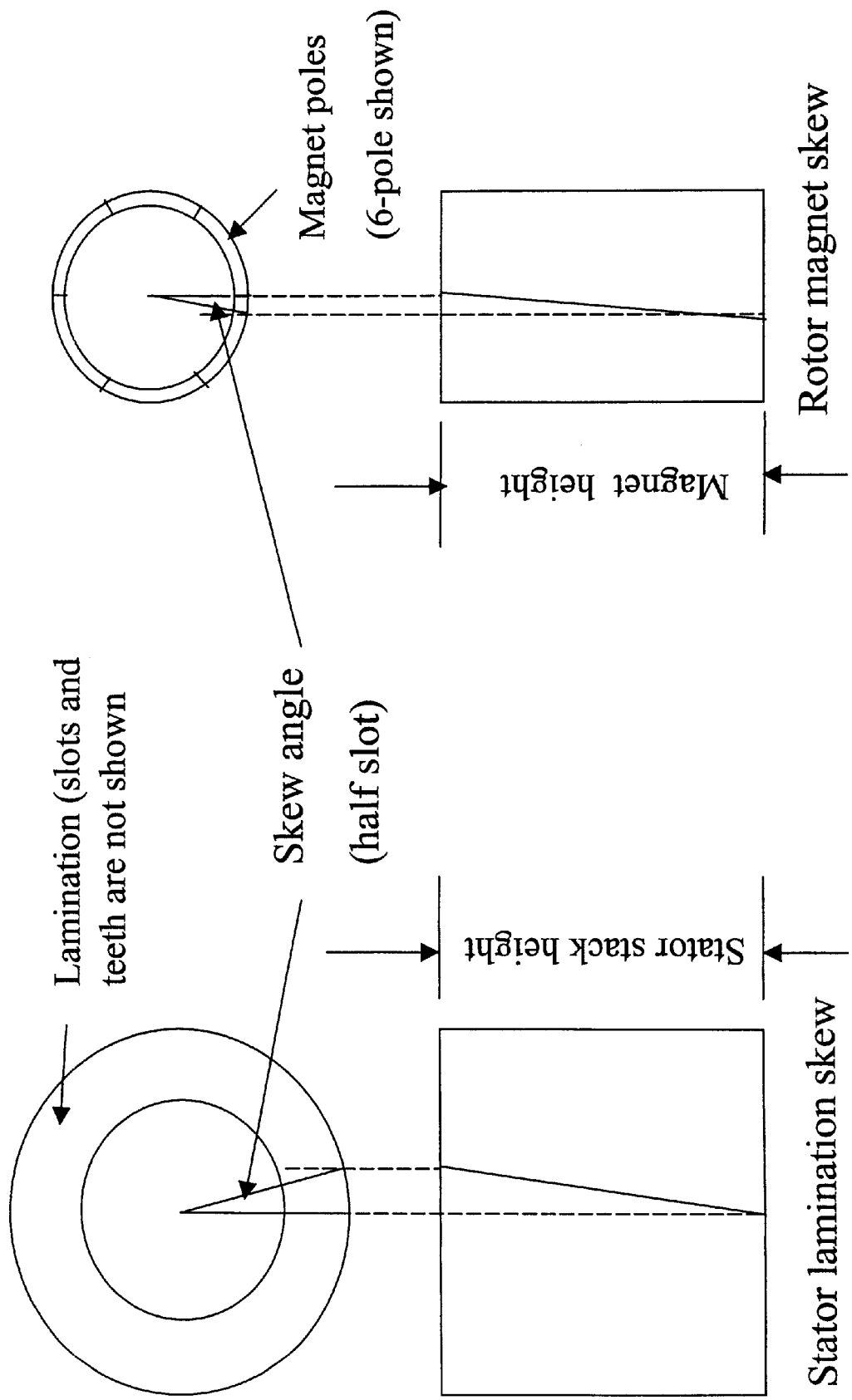
FIG. 6A shows a stator configuration with skew angle.
FIG. 6B shows a rotor magnet configuration with skew angle.
Figure 7:
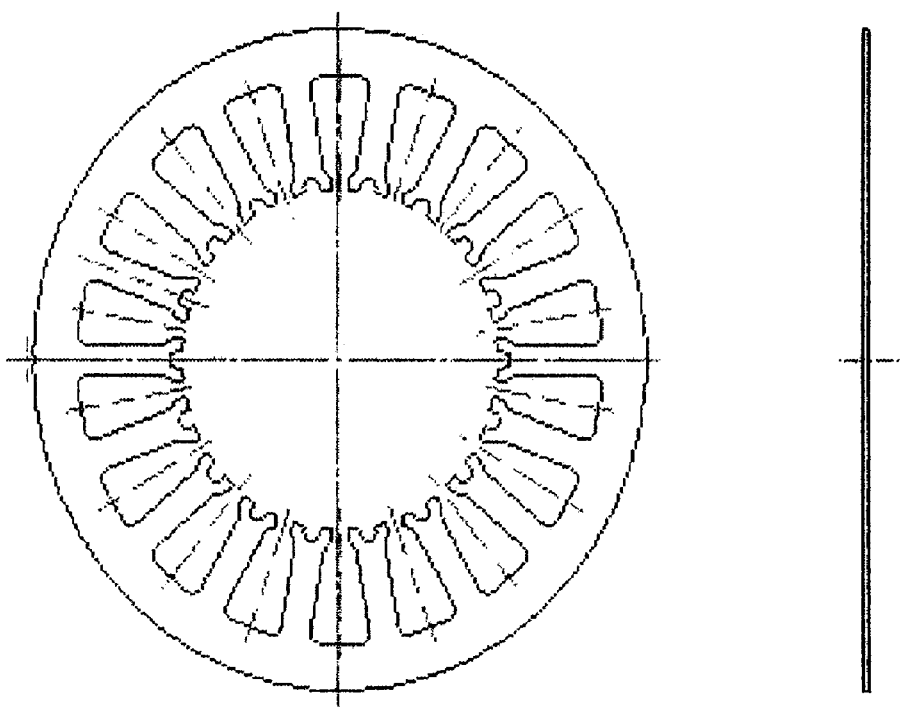
FIG. 7 depicts a stator lamination exhibiting a bifurcated tooth structure.

Referring to FIG. 6A and FIG. 6B, alternative embodiments are depicted showing modifications to a convention one slot skew motor structure. In these embodiments, a half slot skew is incorporated into either the stator 2 as shown in FIG. 6A or the magnets of the rotor 3 as shown in FIG. 6B. By employing a half slot skew these alternative embodiments result in improved flatness of the back emf waveform. It is noteworthy to appreciate that the incorporation of the half slot skew while reducing the torque ripple may result in an increase in the cogging torque of the motor 1. In yet another alternative embodiment, a bifurcated tooth structure for the stator 2 is employed. FIG. 7 shows a lamination for a stator where the bifurcated tooth structure is depicted. The bifurcated tooth structure when combined with a half slot skew motor structure once again yields a motor exhibiting reduced cogging torque and reduced torque ripple. For the disclosed embodiments, with a half slot skew on one of the stator 2, or the magnets of the rotor 3, the θ will equal about 15 electrical degrees. It is also found that the current increase to be delivered during the overlap period so as to minimize torque ripple is about 1.16 times the normal current.

Figure 4:
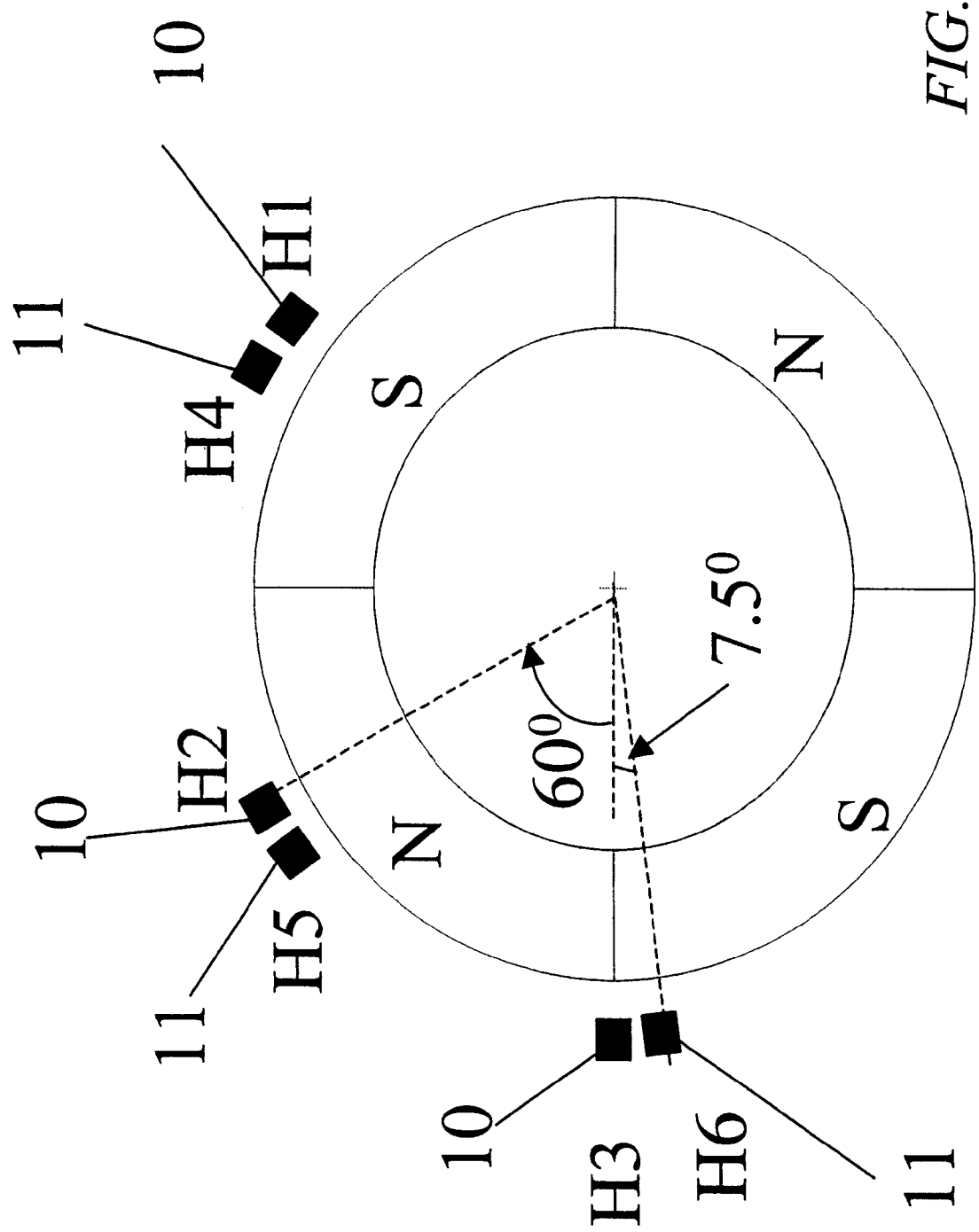
FIG. 4 depicts an axial view of a 4-pole electric motor of the invention.

Referring to FIG. 4, there is shown another embodiment of the invention using two sets of Hall sensors, each set having three sensors, spaced about a 4-pole motor. The first set of Hall sensors H1,H2 and H3 are placed 60 mechanical degrees, or 120 electrical degrees, apart. The same is true for the second set of three hall sensors H4, H5 and H6. Notice that, though the spacing is physically unequal, electrically the hall sensors are nevertheless spaced equally.

Figure 5:
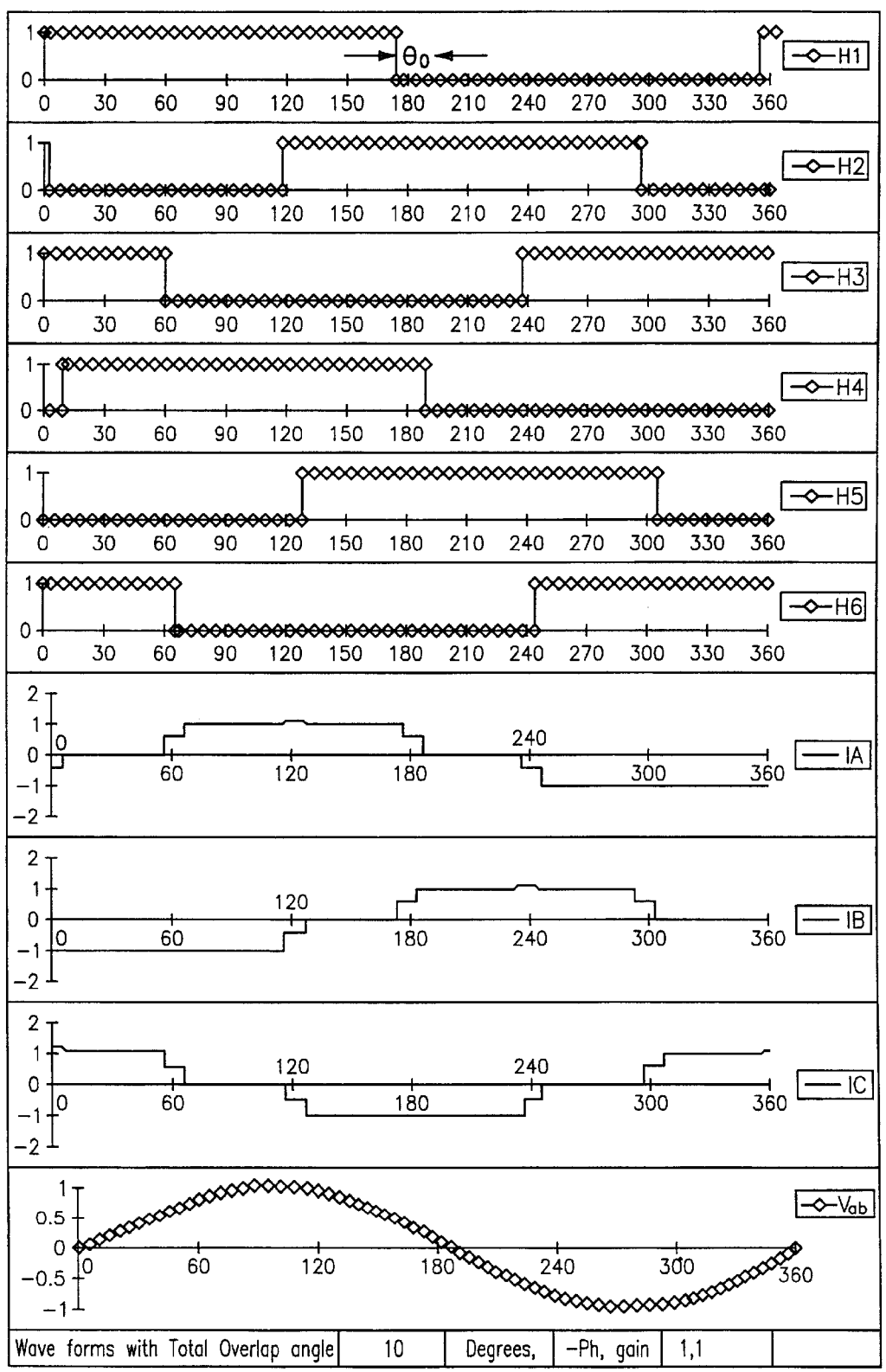
FIG. 5 shows graphs of currents and voltages through various components over time.

Referring to FIG. 5, there is shown a set of graphs depicting the signals to the hall sensors, the currents through the windings, and the induced emf wave form across the phases A and B (Vab). The graphs are plotted with the electrical angle on the x-axis. For machine with NP number of poles the corresponding mechanical angle can be determined by electrical angle*2/NP. The Hall sensor signals are shown in the top six graphs and show how the Hall sensors switch between two values, 0 and 1, to indicate detection of the north and south poles of the sense magnet. The three graphs below these, labeled IA, IB, and IC show the three currents of a three phase voltage supply running through the windings of the motor. The lowest graph shows the induced voltage across the A and B phases (Vab) when the motor is running.

It will be understood that a person skilled in the art may make modifications to the preferred embodiment shown herein within the scope and intent of the claims. While the present invention has been described as carried out in specific embodiments thereof, it is not intended to be limited thereby, but rather is intended to cover the invention broadly within the scope and spirit of the claims.

What is claimed is:

1. A system for reducing torque ripple in an electric motor, comprising:

an electric motor having a stator and a rotor;
   a first set of N Hall sensors;
   a second set of N Hall sensors;
   a controller;
   wherein said N Hall sensors in each said set of Hall sensors is spaced 360/N electrical degrees apart and said first and second sets of Hall sensors are spaced $\theta$ electrical degrees apart;
   wherein said controller is adapted to provide increased current during an overlap period detected by said Hall sensors; and
   wherein said stator is half-slot skew and $\theta$ is about 15 electrical degrees.

2. The system of claim 1 wherein said controller comprises an inverter.

3. The system of claim 1 wherein N=3.

4. The system of claim 1 wherein said increased current is about 1.16 times a normal current.

5. The system of claim 1 further including a bifurcated tooth structure on said stator.

6. A system for reducing torque ripple in an electric motor, comprising:

an electric motor having one of:
      a stator with a half slot skew
      a rotor employing magnets with a half slot skew;
   a first set of N Hall sensors;
   a second set of N Hall sensors;
   a controller;
   wherein said N Hall sensors in each said set of Hall sensors is spaced 360/N electrical degrees apart and said first and second sets of Hall sensors are spaced $\theta$ electrical degrees apart; and
   wherein said controller is adapted to provide increased current during an overlap period detected by said Hall sensors.

7. The system of claim 6 wherein $\theta$ is about 30 electrical degrees.

8. The system of claim 6 wherein said controller comprises an inverter.

9. The system of claim 6 wherein N=3.

10. The system of claim 6 wherein $\theta$ is about 15 electrical degrees.

11. The system of claim 6 wherein said increased current is about 1.16 times a normal current.

12. The system of claim 6 further including a bifurcated tooth structure on said stator.

* * * * *